United States Patent
Vrahoretis

(10) Patent No.: US 12,370,845 B2
(45) Date of Patent: Jul. 29, 2025

(54) DRAWBAR DETECTION DEVICE FOR A VEHICLE HAVING A HITCH RECEIVER

(71) Applicant: GM Global Technology Operations LLC, Detroit, MI (US)

(72) Inventor: Robert Emam Vrahoretis, White Lake Township, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 788 days.

(21) Appl. No.: 17/695,021

(22) Filed: Mar. 15, 2022

(65) Prior Publication Data

US 2023/0294465 A1 Sep. 21, 2023

(51) Int. Cl.
*B60D 1/24* (2006.01)
*B60D 1/28* (2006.01)
*B60D 1/58* (2006.01)
B60D 1/52 (2006.01)
B60D 1/62 (2006.01)

(52) U.S. Cl.
CPC ............. *B60D 1/246* (2013.01); *B60D 1/28* (2013.01); *B60D 1/58* (2013.01); B60D 1/52 (2013.01); B60D 1/62 (2013.01)

(58) Field of Classification Search
CPC . B60D 1/246; B60D 1/28; B60D 1/58; B60D 1/62; B60D 1/52
See application file for complete search history.

(56) References Cited

U.S. PATENT DOCUMENTS

| | | | | |
|---|---|---|---|---|
| 5,727,805 A | * | 3/1998 | La Roque | B60D 1/155 280/491.2 |
| 7,425,014 B1 | * | 9/2008 | Palmer | B60D 1/42 280/479.2 |
| 8,414,011 B2 | * | 4/2013 | Dague | B60D 1/60 280/491.1 |
| 9,266,476 B2 | * | 2/2016 | Mendoza | B60D 1/52 |
| 9,738,124 B1 | * | 8/2017 | Verheul | B60D 1/241 |
| 2013/0102162 A1 | * | 4/2013 | Holmes | H01R 13/629 439/34 |
| 2021/0008937 A1 | * | 1/2021 | Muck | B60D 1/60 |
| 2022/0176861 A1 | * | 6/2022 | Haigler | B66F 7/12 |
| 2023/0331051 A1 | * | 10/2023 | Kalhous | B60D 1/241 |
| 2023/0391152 A1 | * | 12/2023 | Salter | H01R 13/15 |
| 2024/0140155 A1 | * | 5/2024 | McCain | B60D 1/60 |

\* cited by examiner

*Primary Examiner* — Valentin Neacsu
*Assistant Examiner* — Marlon A Arce
(74) *Attorney, Agent, or Firm* — CANTOR COLBURN LLP

(57) ABSTRACT

A drawbar detection device configured to be mounted to a hitch receiver having a drawbar opening and a locking pin opening device includes a blocking member pivotally connected relative to the hitch receiver. The blocking member includes a blocking element that, in a first position, covers one of the draw bar opening and the locking pin opening and, in a second position uncovers the one of the drawbar opening and the locking pin opening. A sensor is operatively associated with the blocking member. The sensor detects whether the blocking element is in the one of the first position and the second position and, upon detecting the blocking element in the second position, the sensor signals a vehicle control system to disable a vehicle latch system.

20 Claims, 7 Drawing Sheets

DRAWBAR DETECTION DEVICE FOR A VEHICLE HAVING A HITCH RECEIVER

INTRODUCTION

The subject disclosure relates to the art of vehicles and, more particularly, to a drawbar detection device for a vehicle having a hitch receiver.

Many vehicles are provided with a hitch receiver. The hitch receiver may be used to support an article, such as a shelf, from a rear of the vehicle or, provide an interface for towing. When configured for towing, a hitch ball is installed into the hitch receiver. The hitch ball is typically mounted to a draw bar and held in place by a hitch pin. In some cases, the hitch pin may be lockable. The hitch ball interfaces with a ball receiver provided on a trailer tongue. The trailer tongue or forward portion of the trailer often supports a jack that may be operated to raise and lower the ball receiver onto the hitch ball. The jack projects upwardly from the trailer tongue and often includes an operating handle.

Many vehicles include a rear hatch or door that may be operated to expose a bed or storage area. Most hatches pivot upwardly and thus typically do not interact with the jack or the operating handle. Other vehicles include a hatch or gate that rotates downward. A pickup truck for example includes a tail gate that rotates downward to provide access to a bed area. If attached to a trailer, the tail gate may interact with the jack and/or operating handle. If a user opens the tail gate manually, a negative interaction is generally avoided. However, a tail gate that can be opened from within the vehicle is prone to interaction with the jack. Accordingly, it is desirable to provide a system that locks out automatic operation of a tail gate from within the vehicle.

SUMMARY

Disclosed, in accordance with a non-limiting example, is a drawbar detection device configured to be mounted to a hitch receiver having a drawbar opening and a locking pin opening. The drawbar detection device includes a blocking member pivotally connected relative to the hitch receiver. The blocking member includes a blocking element that, in a first position, covers one of the draw bar opening and the locking pin opening and, in a second position uncovers the one of the drawbar opening and the locking pin opening. A sensor is operatively associated with the blocking member. The sensor detects whether the blocking element is in the one of the first position and the second position and, upon detecting the blocking element in the second position, the sensor signals a vehicle control system to disable a vehicle latch system.

In addition to one or more of the features described above or below, or as an alternative, further embodiments could include wherein the blocking element extends across a portion of the drawbar opening.

In addition to one or more of the features described above or below, or as an alternative, further embodiments could include wherein the blocking element extends across a portion of the locking pin opening.

In addition to one or more of the features described above or below, or as an alternative, further embodiments could include wherein the blocking element includes a first blocking element portion that extends across the drawbar opening and a second blocking element portion that extends across the locking pin opening.

In addition to one or more of the features described above or below, or as an alternative, further embodiments could include wherein the sensor comprises a limit switch including an activation button.

In addition to one or more of the features described above or below, or as an alternative, further embodiments could include wherein the blocking member includes a cam surface that selectively engages with the activation button.

In addition to one or more of the features described above or below, or as an alternative, further embodiments could include wherein the cam surface includes a constant radius.

In addition to one or more of the features described above or below, or as an alternative, further embodiments could include further comprising a base member fixedly mounted to the hitch receiver, the blocking member being pivotally connected to the base member.

In addition to one or more of the features described above or below, or as an alternative, further embodiments could include wherein the sensor is mounted to the base member.

In addition to one or more of the features described above or below, or as an alternative, further embodiments could include wherein the blocking element includes a first blocking element portion that extends across the drawbar opening and a second blocking element portion that extends across the locking pin opening, the first blocking element portion including a notch that fully exposes the drawbar opening.

Also disclosed is a vehicle including a body including a passenger compartment and a tail gate that is selectively pivotal relative to the body and a controller including a tail gate actuator arranged in the passenger compartment. The tail gate actuator selectively opens the tail gate. A hitch receiver is fixedly mounted relative to the body. The hitch receiver has a drawbar opening and a locking pin opening. A drawbar detection device is mounted relative to the hitch receiver. The drawbar detection device includes a blocking member pivotally connected relative to the hitch receiver. The blocking member includes a blocking element that, in a first position, covers one of the draw bar opening and the locking pin opening and, in a second position uncovers the one of the drawbar opening and the locking pin opening. A sensor is operatively associated with the blocking member. The sensor detects whether the blocking element is in the one of the first position and the second position and, upon detecting the blocking element in the second position, the sensor signals a vehicle control system to disable a vehicle latch system.

In addition to one or more of the features described above or below, or as an alternative, further embodiments could include wherein the blocking element extends across a portion of the drawbar opening.

In addition to one or more of the features described above or below, or as an alternative, further embodiments could include wherein the blocking element extends across a portion of the locking pin opening.

In addition to one or more of the features described above or below, or as an alternative, further embodiments could include wherein the blocking element includes a first blocking element portion that extends across the drawbar opening and a second blocking element portion that extends across the locking pin opening.

In addition to one or more of the features described above or below, or as an alternative, further embodiments could include wherein the sensor comprises a limit switch including an activation button.

In addition to one or more of the features described above or below, or as an alternative, further embodiments could include wherein the blocking member includes a cam surface that selectively engages with the activation button.

In addition to one or more of the features described above or below, or as an alternative, further embodiments could include wherein the cam surface includes a constant radius.

In addition to one or more of the features described above or below, or as an alternative, further embodiments could include further comprising a base member fixedly mounted to the hitch receiver, the blocking member being pivotally connected to the base member.

In addition to one or more of the features described above or below, or as an alternative, further embodiments could include wherein the sensor is mounted to the base member.

In addition to one or more of the features described above or below, or as an alternative, further embodiments could include wherein the blocking element includes a first blocking element portion that extends across the drawbar opening and a second blocking element portion that extends across the locking pin opening, the first blocking element portion including a notch that fully exposes the drawbar opening.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
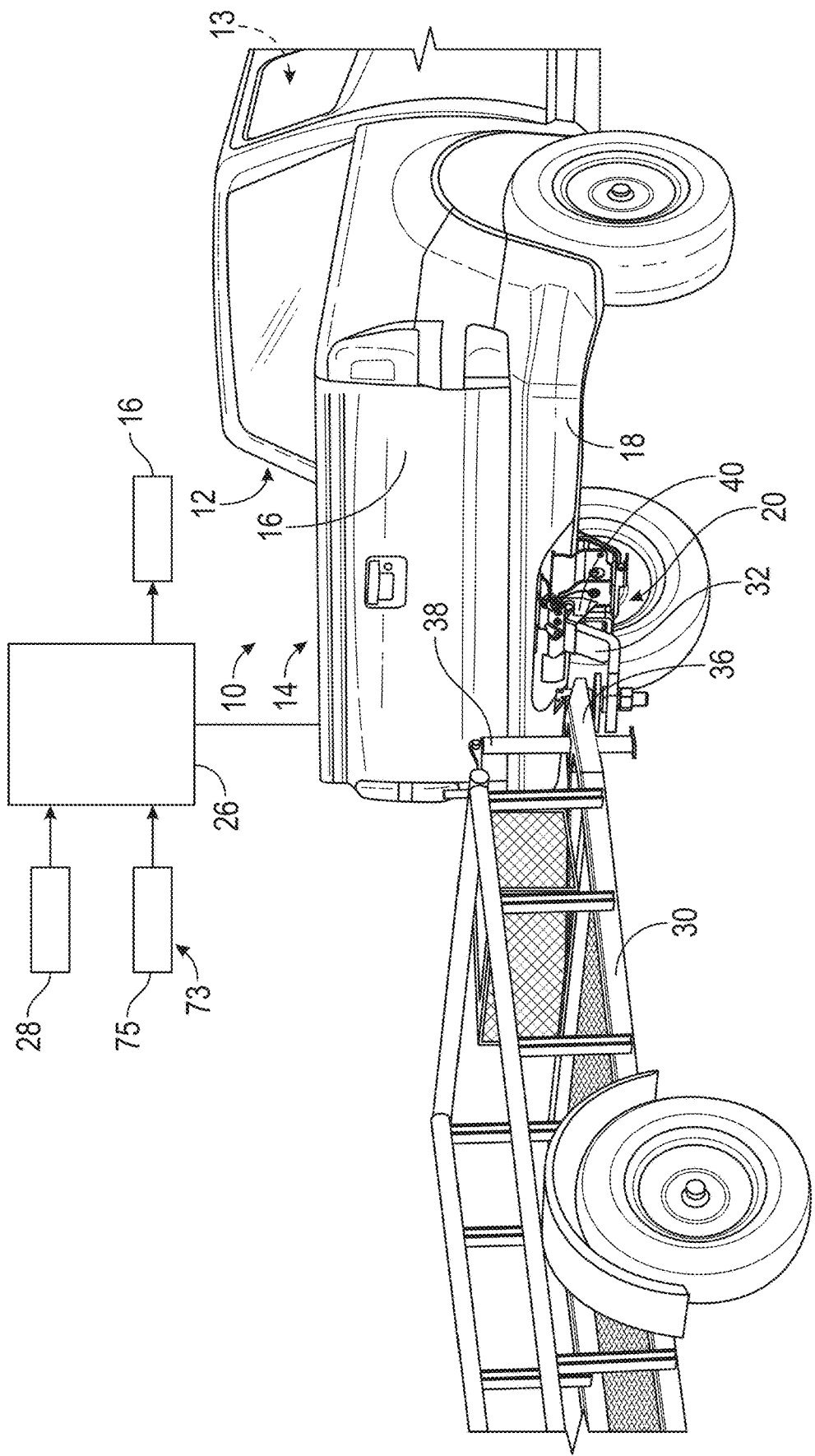
FIG. 1 depicts a pickup truck coupled to a trailer by a drawbar connected to a hitch receiver having a drawbar detection device, according to a non-limiting example.

The following description is merely exemplary in nature and is not intended to limit the present disclosure, its application or uses. It should be understood that throughout the drawings, corresponding reference numerals indicate like or corresponding parts and features.

Figure 2:
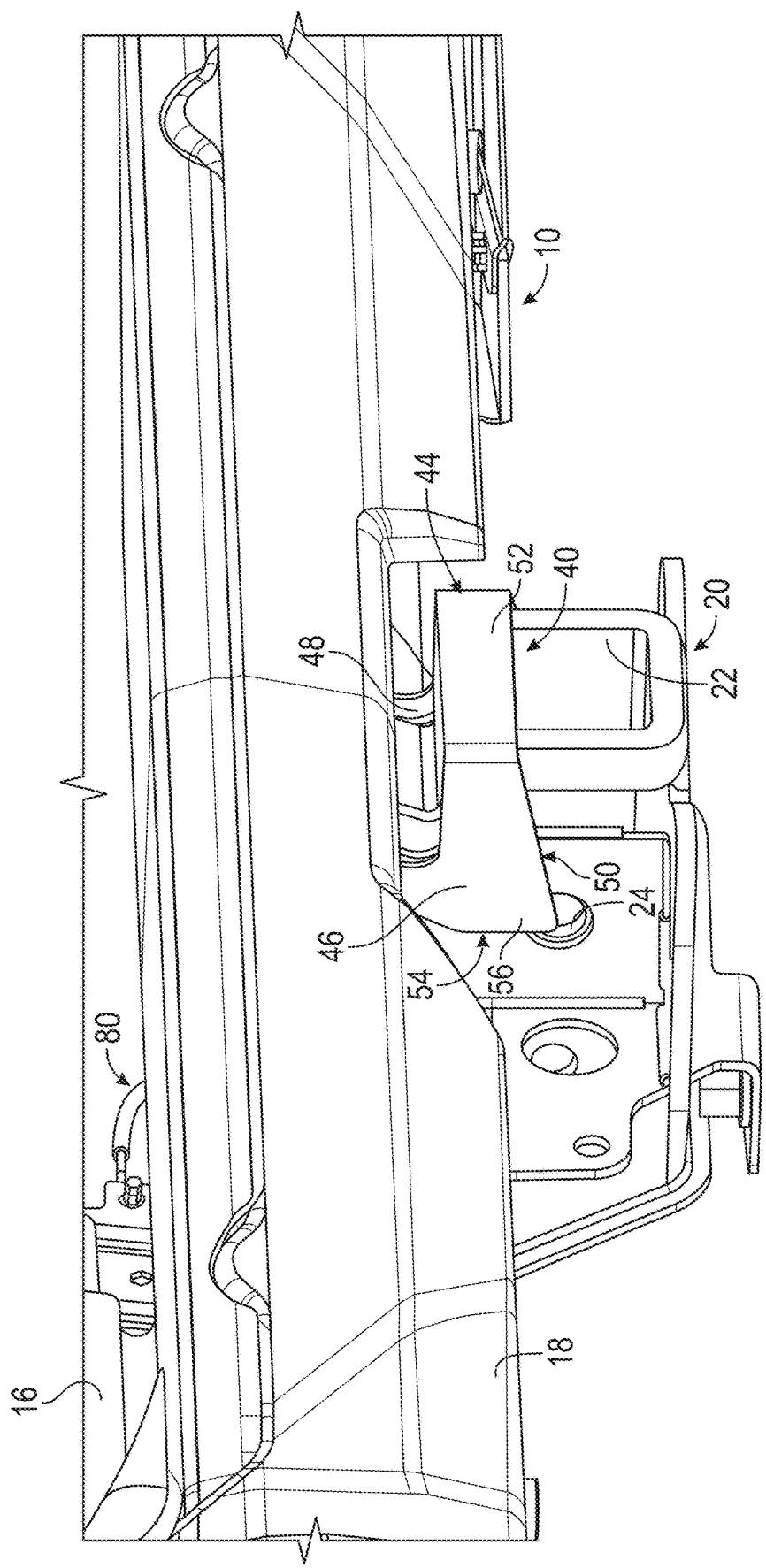
FIG. 2 is a depicts a rear portion of the pickup truck of FIG. 1 illustrating the drawbar detection device, in accordance with a non-limiting example.

A vehicle, in accordance with a non-limiting example, is indicated generally at 10 in FIG. 1. Vehicle 10 takes the form of a pickup truck 12 having a passenger compartment 13 and a bed 14. A tailgate 16 extends across bed 14. Tailgate 16 rotates downwardly when opened. A bumper 18 is positioned below tailgate 16. A hitch receiver 20 is connected to a vehicle frame (not shown) below bumper 18. As shown in FIG. 2, hitch receiver 20 includes a drawbar opening 22 and a locking pin opening 24.

In a non-limiting example, vehicle 10 includes a controller 26 connected to an actuator 28. Controller 26 is operable to control a wide variety of vehicle functions including operating tailgate 16. In a non-limiting example, a user can open tailgate 16 from within passenger compartment 13 by interfacing with actuator 28. That is, upon interfacing with actuator 28, tailgate 16 swings downwardly exposing bed 14. In a towing configuration as shown in FIG. 1, opening tailgate 16 can result in damage. When towing a trailer 30, a drawbar 32 is installed in drawbar opening 22 of hitch receiver 20. Drawbar 32 supports a ball 34 (FIG. 5) that interfaces with a ball connector 36 on trailer 30. Trailer 30 is shown to include a jack 38 that can be contacted by tailgate 16 if opened without proper care.

Figure 3:
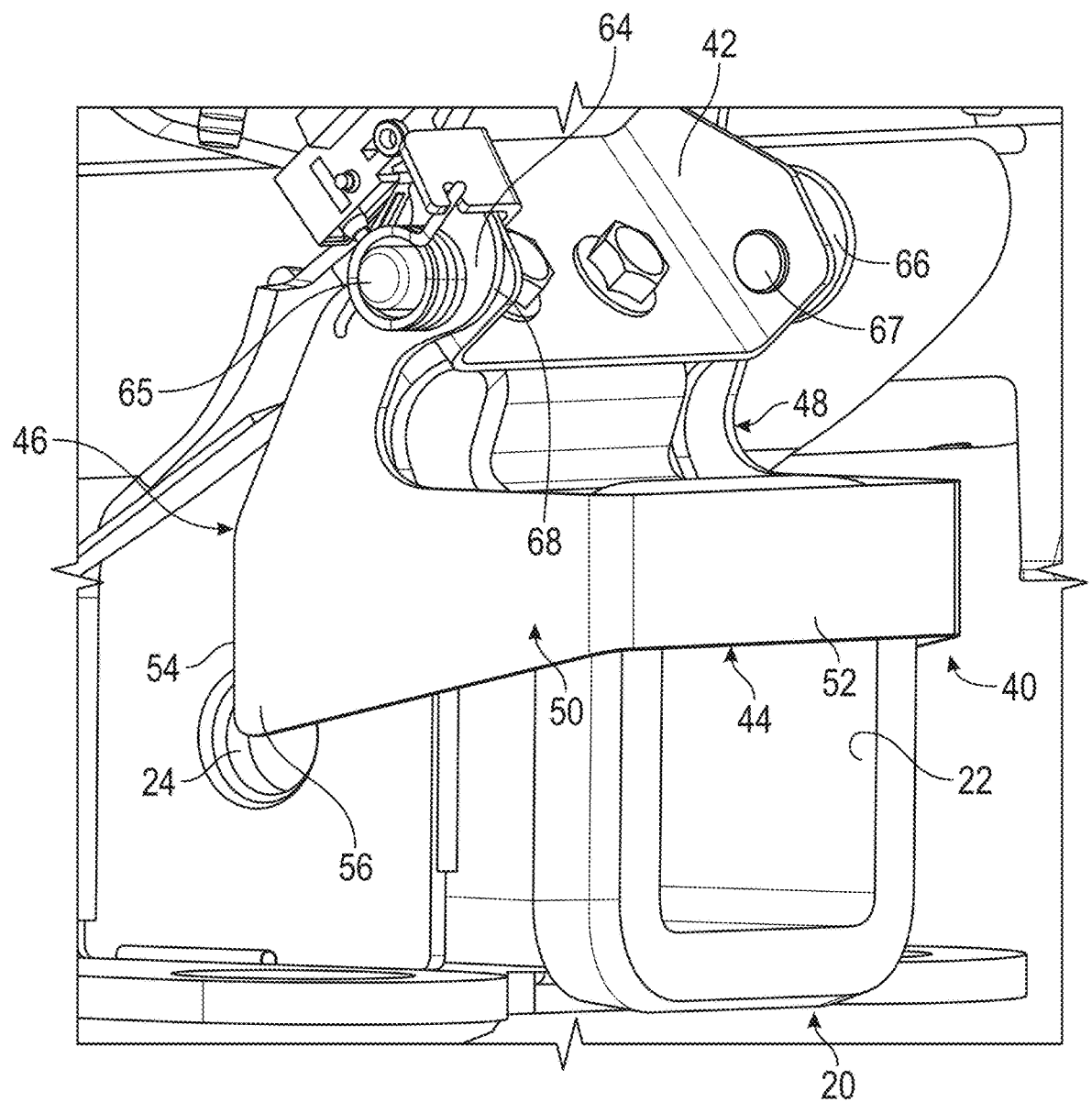
FIG. 3 depicts the rear portion of the pickup truck of FIG. 2 without a bumper, in accordance with a non-limiting example.

In order to prevent undesirable contacts between tailgate 16 and jack 38, vehicle 10 includes a drawbar detection device 40 that locks out actuator 28 when drawbar 32 is installed in drawbar opening 22 as will be detailed herein. In accordance with a non-limiting example shown in FIGS. 2 and 3, drawbar detection device 40 includes a base member 42 that is fixedly secured to vehicle 10. In a non-limiting example, base member 42 may be secured to a vehicle frame (not separately labeled). A blocking member 44 is pivotally connected to base member 42. Blocking member 44 includes a first arm 46, and a second arm 48. Blocking member 44 supports a blocking element 50 that detects a presence of drawbar 32 in hitch receiver 20.

In a non-limiting example, blocking element 50 may include a first blocking element portion 52 that selectively blocks drawbar opening 22 and a second blocking element portion 54 that selectively blocks locking pin opening 24. Second blocking element portion 54 may include a first corner 56 of first arm 46 and a second corner (not shown) of second arm 48. First corner 56 and the second corner selectively block opposing sides (not separately labeled) of locking pin opening 24. In a non-limiting example, first arm 46 includes a first terminal end 64 pivotally connected to base member 42 through a first hinge pin 65 and second arm 48 includes a second terminal end 66 that is pivotally connected to base member 42 through a second hinge pin 67. In a non-limiting example, first terminal end 64 includes a cam surface 68. In a non-limiting embodiment, cam surface 68 includes a constant radius.

In a non-limiting example, drawbar detection device 40 includes a sensor 73. In a non-limiting example depicted in FIG. 4, sensor 73 takes the form of a limit switch 75 mounted to base member 42 and operatively connected to controller 26. In a non-limiting example, limit switch 75 has an actuator button 78 that interfaces with cam surface 68, FIG. 5, to sense a position of blocking member 44 relative to base member 42. Limit switch 75 includes a conductor 80, FIG. 2, that connects with and integrates into a vehicle wire harness (not shown) so as to provide a connection with controller 26. While described as a limit switch, it should be understood that sensor 73 can take on a variety of forms including accelerometers, mercury switches, or the like.

Figure 4:
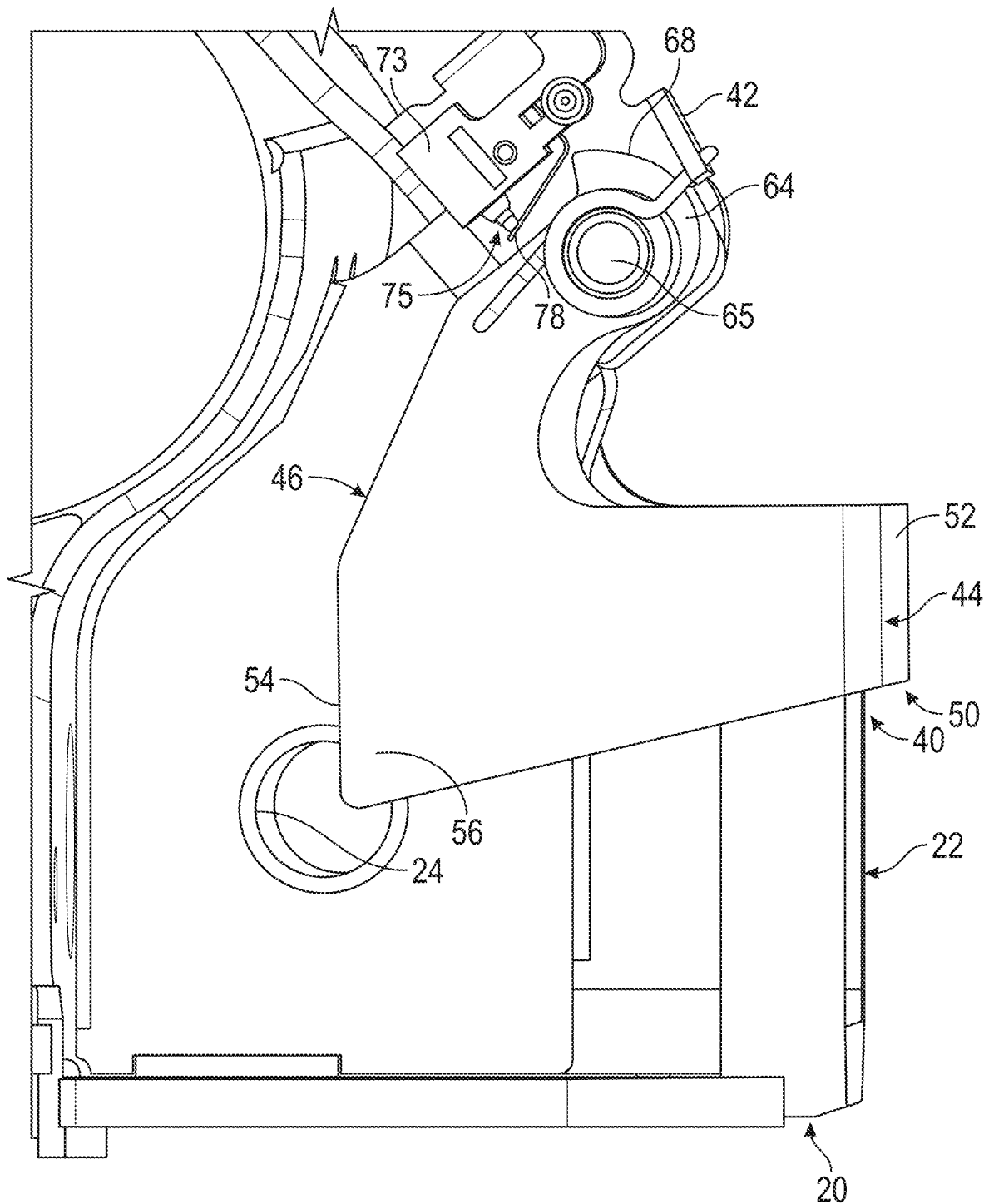
FIG. 4 is a side view of the drawbar detection device showing a blocking member in a first position, in accordance with a non-limiting example.
Figure 5:
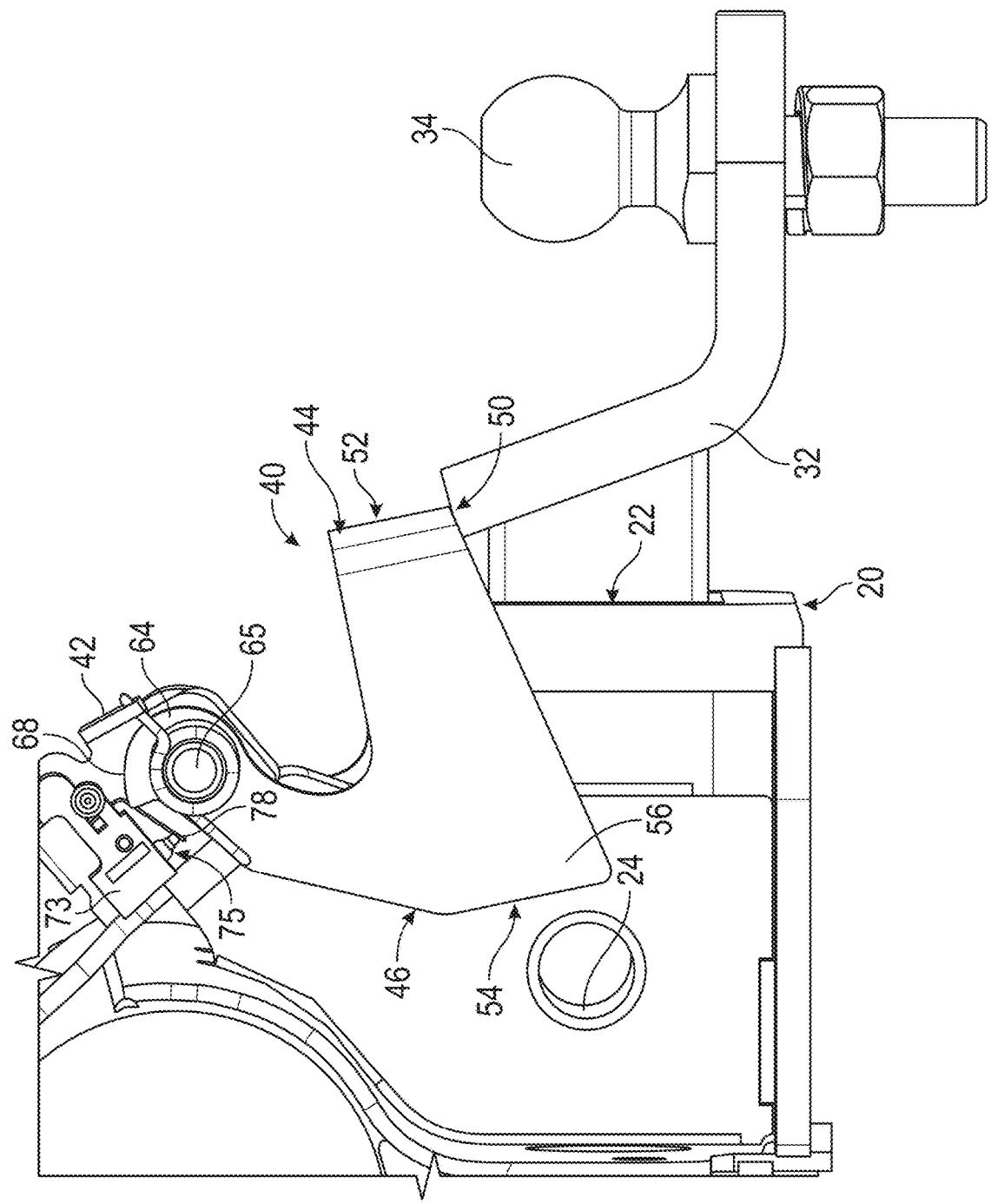
FIG. 5 is a side view of the drawbar detection device of FIG. 4 showing the blocking member in a second position, in accordance with a non-limiting example.

In a non-limiting example, when drawbar 32 is not installed in drawbar opening 22, blocking member 44 is in a first position such as shown in FIG. 4. In the first position, sensor 73 signals controller 26 that actuator 28 may be activated from within passenger compartment 13 to open tailgate 16. When configuring vehicle 10 for towing, blocking member 44 pivots upwardly about first hinge pin 65 and the second hinge pin 67 to a second position exposing drawbar opening 22 and locking pin opening 24 allowing drawbar 32 to be installed and locked into hitch receiver 20 as shown in FIG. 5. In the second position, cam surface 68 engages actuator button 78 activating limit switch 75 and signaling controller 26 that drawbar 32 is present in drawbar opening 22. When drawbar 22 is detected, controller 26 disables actuator 28 so that tailgate 16 cannot be opened from within passenger compartment 13.

Figure 6:
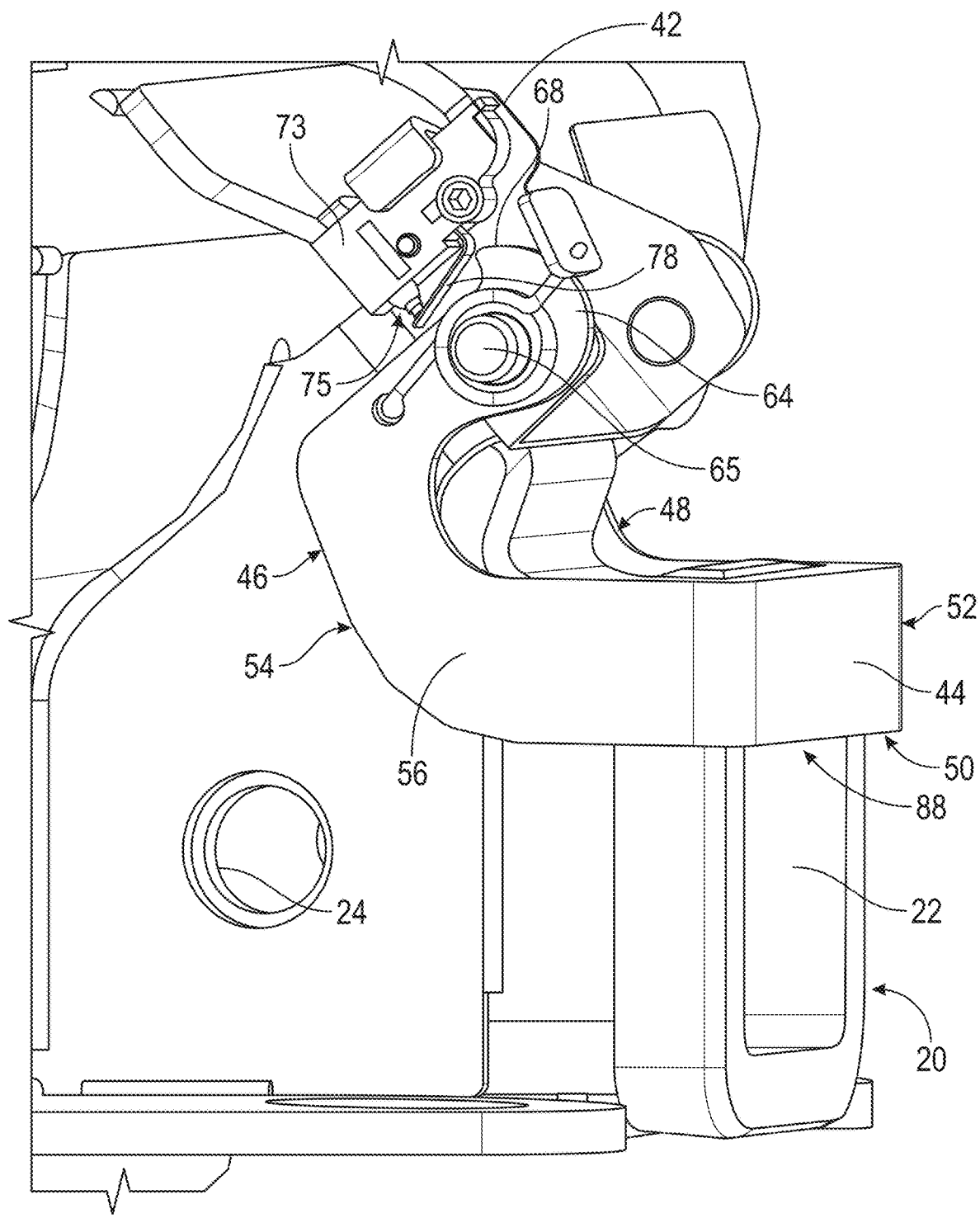
FIG. 6 depicts a drawbar detection device in accordance with another non-limiting example.
Figure 7:
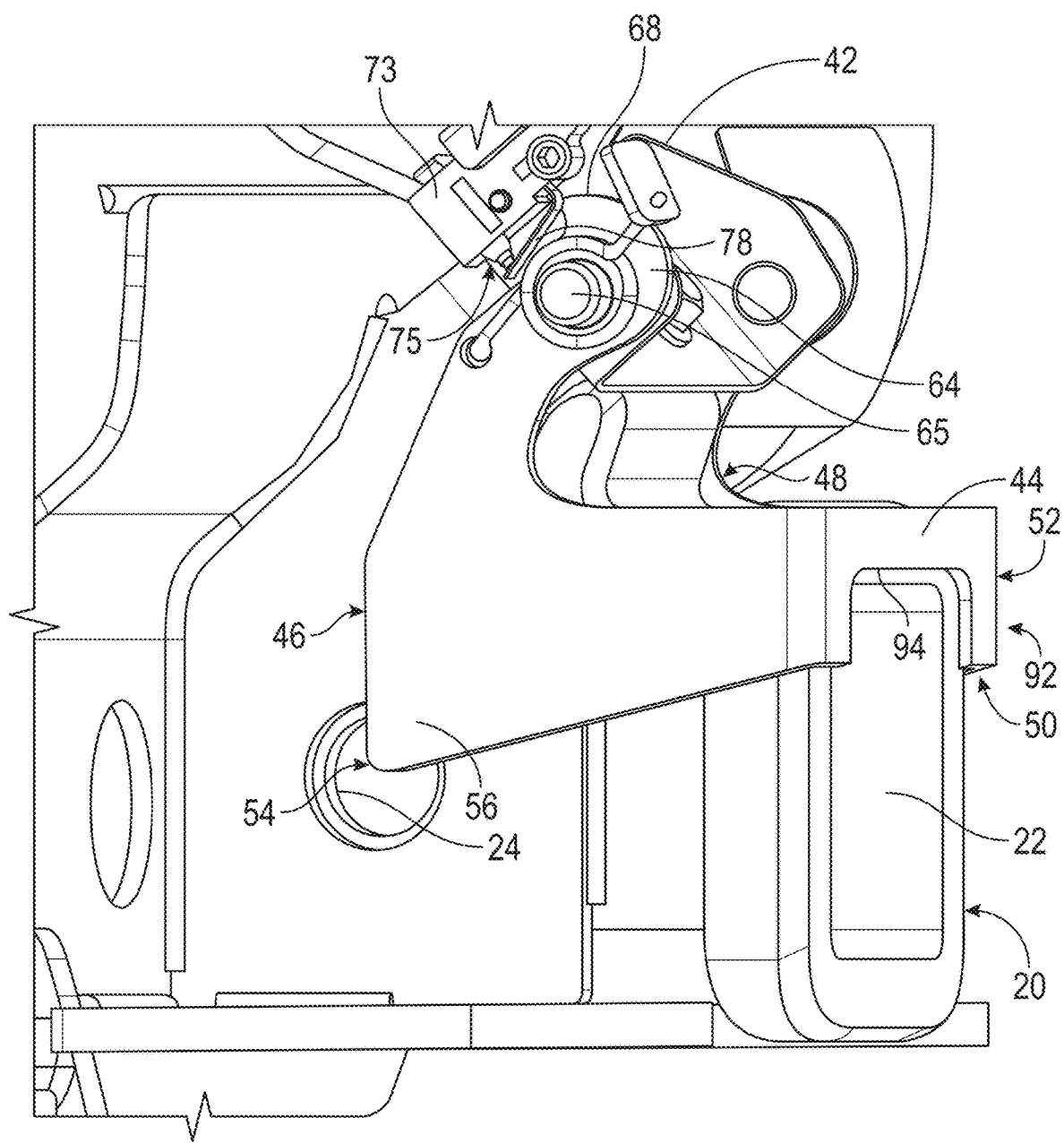
FIG. 7 depicts a drawbar detection device in accordance with yet another non-limiting example.

At this point, it should be understood that the non-limiting examples described herein present a drawbar detection device that integrates seamlessly with vehicle controls, is easy to manufacture, and low cost. Further, drawbar detection device 40 can detect the presence of a drawbar and a locking pin. In other non-limiting examples, a drawbar detection device 88 can be configured to sense only a drawbar as shown in FIG. 6. FIG. 7 depicts a drawbar detection device 92 that only selectively covers locking pin opening 24. Blocking member 44 of drawbar detection device 92 includes a cutout or notch 94 that maintains drawbar opening unobscured.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A drawbar detection device configured to be mounted to a hitch receiver having a drawbar opening and a locking pin opening, the drawbar detection device comprising:
   a blocking member pivotally connected relative to the hitch receiver, the blocking member including a blocking element that, in a first position, covers one of the draw bar opening and the locking pin opening and, in a second position uncovers the one of the drawbar opening and the locking pin opening; and
   a sensor operatively associated with the blocking member, the sensor detecting whether the blocking element is in the one of the first position and the second position and, upon detecting the blocking element in the second position, the sensor signals a vehicle control system to disable a vehicle latch system,
   wherein the sensor comprises a limit switch including an activation button, and
   wherein the blocking member includes a cam surface that selectively engages with the activation button.

2. The drawbar detection device according to claim 1, wherein the blocking element extends across a portion of the drawbar opening.

3. The drawbar detection device according to claim 1, wherein the blocking element extends across a portion of the locking pin opening.

4. The drawbar detection device according to claim 1, wherein the blocking element includes a first blocking element portion that extends across the drawbar opening and a second blocking element portion that extends across the locking pin opening.

5. The drawbar detection device according to claim 1, wherein the cam surface includes a constant radius.

6. The drawbar detection device according to claim 1, further comprising a base member fixedly mounted to the hitch receiver, the blocking member being pivotally connected to the base member.

7. The drawbar detection device according to claim 6, wherein the sensor is mounted to the base member.

8. The drawbar detection device according to claim 1, wherein the blocking element includes a first blocking element portion that extends across the drawbar opening and a second blocking element portion that extends across the locking pin opening, the first blocking element portion including a notch that fully exposes the drawbar opening.

9. The drawbar detection device of claim 1, wherein, upon detecting the blocking element in the second position, the sensor signals the vehicle control system to prevent a tail gate from opening from within a passenger compartment.

10. The drawbar detection device of claim 1, upon detecting the blocking element in the second position, the sensor signals the vehicle control system to disable a tail gate actuator.

11. A vehicle comprising:
    a body including a passenger compartment and a tail gate that is selectively pivotal relative to the body;
    a controller including a tail gate actuator arranged in the passenger compartment, the tail gate actuator selectively opening the tail gate;
    a hitch receiver fixedly mounted relative to the body, the hitch receiver having a drawbar opening and a locking pin opening; and
    a drawbar detection device mounted relative to the hitch receiver, the drawbar detection device comprising:
    a blocking member pivotally connected relative to the hitch receiver, the blocking member including a blocking element that, in a first position, covers one of the draw bar opening and the locking pin opening and, in a second position uncovers the one of the drawbar opening and the locking pin opening; and
    a sensor operatively associated with the blocking member, the sensor detecting whether the blocking element is in the one of the first position and the second position and, upon detecting the blocking element in the second position, the sensor signals a vehicle control system to disable the tail gate actuator.

12. The vehicle according to claim 11, wherein the blocking element extends across a portion of the drawbar opening.

13. The vehicle according to claim 11, wherein the blocking element extends across a portion of the locking pin opening.

14. The vehicle according to claim 11, wherein the blocking element includes a first blocking element portion that extends across the drawbar opening and a second blocking element portion that extends across the locking pin opening.

15. The vehicle according to claim 11, wherein the sensor comprises a limit switch including an activation button.

16. The vehicle according to claim 11, further comprising a base member fixedly mounted to the hitch receiver, the blocking member being pivotally connected to the base member.

17. The vehicle according to claim 16, wherein the sensor is mounted to the base member.

18. The vehicle according to claim 11, wherein the blocking element includes a first blocking element portion that extends across the drawbar opening and a second blocking element portion that extends across the locking pin opening, the first blocking element portion including a notch that fully exposes the drawbar opening.

19. A vehicle comprising:
    a body including a passenger compartment and a tail gate that is selectively pivotal relative to the body;

a controller including a tail gate actuator arranged in the passenger compartment, the tail gate actuator selectively opening the tail gate;

a hitch receiver fixedly mounted relative to the body, the hitch receiver having a drawbar opening and a locking pin opening; and a drawbar detection device mounted relative to the hitch receiver, the drawbar detection device comprising:

a blocking member pivotally connected relative to the hitch receiver, the blocking member including a blocking element that, in a first position, covers one of the draw bar opening and the locking pin opening and, in a second position uncovers the one of the drawbar opening and the locking pin opening; and a sensor operatively associated with the blocking member, the sensor detecting whether the blocking element is in the one of the first position and the second position and, upon detecting the blocking element in the second position, the sensor signals a vehicle control system to disable a vehicle latch system, wherein the sensor comprises a limit switch including an activation button, and wherein the blocking member includes a cam surface that selectively engages with the activation button.

20. The vehicle according to claim 19, wherein the cam surface includes a constant radius.

* * * * *